Patented Mar. 8, 1927.

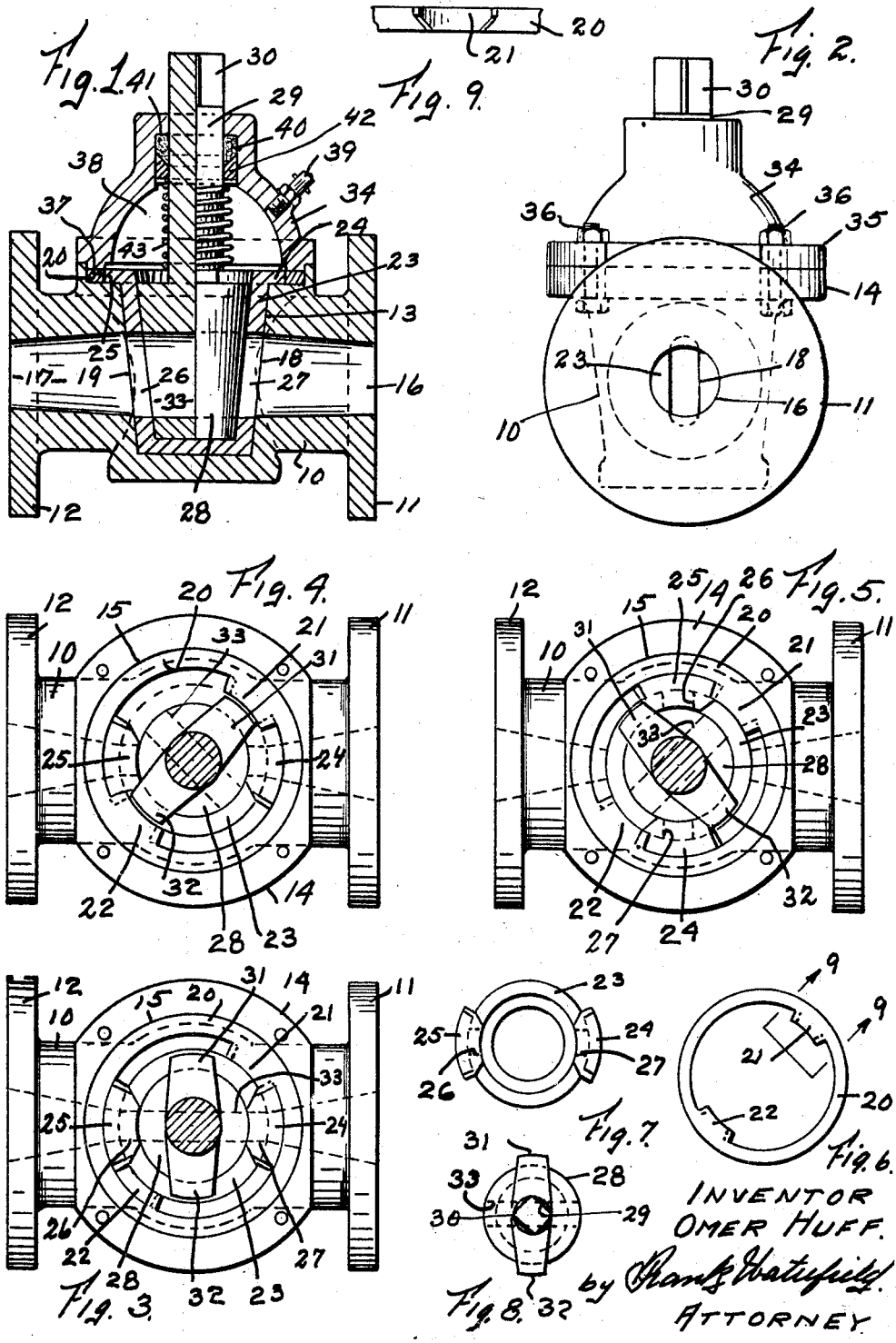

1,620,464

UNITED STATES PATENT OFFICE.

OMER HUFF, OF FRESNO, CALIFORNIA.

BLOW-OFF COCK.

Application filed June 22, 1925. Serial No. 38,625.

My invention relates to a blow-off cock to use with steam boilers and the like.

Heretofore in the use of blow-off cocks of the usual type considerable difficulty has been experienced therewith due to the fact that the scale and other residuum from the boiler, in its passage through the valve during the blow-off, tends to cut or abrade parts of the valve, thereby causing a leakage and otherwise damaging the same and necessitating frequent renewals.

It is the object of my invention to provide a cock so constructed and arranged as to afford protection for the working parts of the valve against abrasion and other damage from the impurities flowing from the boiler during the blow-off, and which will be simple in construction and operation and of a maximum efficiency.

A further object is to provide in a cock of the above character means for supplying a lubricant to the interior thereof by means of which the working parts thereof are protected from corrosion and freezing.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 1 is a central longitudinal section, partly in elevation, of my invention detached from its place of use.

Fig. 2 is a right hand end elevation of Fig. 1.

Fig. 3 is a top plan of my device with the cap removed showing the cock in its open position.

Fig. 4 is a view similar to Fig. 3 showing my cock in a partly closed position.

Fig. 5 is a view similar to Fig. 3 showing my cock in its closed position.

Figs. 6, 7, and 8, are details of parts of my device.

Fig. 9 is a section on the line 9—9 of Fig. 6.

Referring to the drawings my device comprises a body member 10 provided at each end with a flange 11 or 12. Provided centrally of member 10 is a vertically extending recess 13 which tapers downwardly and inwardly and surrounding the upper end of this recess is an annular flange 14 provided with a concentric recess 15 in the upper face thereof, which recess is connected to the upper end of recess 13. Extending longitudinally of body member 10 are recesses 16 and 17. Recesses 16 and 17 are circular at their outer ends and taper inwardly and terminate at their inner ends in elongated slots 18 and 19, the purpose of which will be obvious. Mounted within recess 15 is a ring 20 provided with oppositely disposed, inwardly extending, stops 21 and 22 the radial edges of which are bevelled, as best shown in Fig. 9. It is here noted that ring 20 can be made integral with body 10. Revolubly mounted in recess 13 is a cup-shaped member 23 on the upper edge of which are provided radially extending lugs 24 and 25 the radial edges of which are bevelled, as best shown in Fig. 7, which lugs are adapted for engagement with stops 21 and 22 of ring 20. Cup 23 is provided with oppositely disposed, elongated apertures 26 and 27 adapted to register with the elongated apertures 19 and 18 of member 10. Revolubly mounted within cup 23 is a plug 28 provided with an upwardly extending stem 29 the upper end of which is square at 30, the purpose of which will be obvious. Plug 28 is provided on its upper end with oppositely extending projections 31 and 32 adapted for engagement with the lugs 24 and 25 of cup 23. Plug 28 is provided with a transverse elongated aperture 33 adapted to register with the apertures 26 and 27 of cup 23 when the valve is in its open position.

The upper end of recess 15 is closed by a cap 34 provided with a flange 35 which coincides with flange 14 and is held positioned by bolts 36 which pass through flanges 35 and 14. Cap 34 is provided with a downwardly projecting annular rim 37 which rests upon and coincides with ring 20 and serves to hold said ring against rotation. Provided in the interior of cap 34 is a grease chamber 38 which is filled by means of an alemite fitting 39. Provided in the upper end of cap 34 is an annular packing chamber 40 adapted to receive packing material 41 and mounted within said chamber, immediately below packing 41, is a gland 42. Coiled around stem 29, between gland 42 and the upper end of plug 28, is a coil spring 43, the purpose of which is to press gland 42 upwardly to assist packing 41 in providing a tight joint between stem 29 and cap 34.

In the operation of my device when in its normal closed position the parts will lie in the positions shown in Fig. 5. When it is desired to open the same, stem 29 will be rotated counter clockwise thereby causing projections 31 and 32 on plug 28 to engage the lugs 24 and 25 of cup 23, and continue to rotate the plug 28 and cup 23 counter clockwise until the lugs 24 and 25 engage stops 21 and 22 on ring 20, thereby bringing the apertures 26 and 27 of cup 23 into registry with the apertures 19 and 18 of body 10. Stem 29 is then rotated in a reverse direction to the position shown in Fig. 3, bringing the aperture 33 into register with apertures 26 and 27 of cup 23. In closing off the valve this operation will be reversed.

Having described my invention, what I claim is:

1. A blow-off cock comprising a body member; a vertically extending, downwardly tapering, recess in said body member centrally of the length thereof; longitudinally extending recesses in said body member; an annular recess surrounding the upper end of said vertical recess; a hollow cup revolubly mounted in said vertical recess having opposed apertures therein adapted to be brought into registry with said body recesses; a plug revolubly mounted in said cup having an aperture therethrough adapted to be brought into registry with the apertures in said cup; an annular ring mounted in said annular recess provided with oppositely disposed, inwardly projecting stops; outwardly projecting lugs on the upper end of said cup adapted to engage the stops on said ring; radially extending projections on said plug adapted to engage the lugs on said cup, whereby said cup and plug are rotated in unison; and means to rotate said plug.

2. In a blow off cock the combination of a circular chamber having outlets on the line of a diameter thereof, a circular cup member adapted to rotatably fit in the circular chamber, said cup having two openings through the wall on the line of a diameter, said openings being adapted when assembled with the chamber to register with the openings in the chamber, a plug adapted to rotatably fit within the cup and having an opening therethrough on the line of a diameter, said plug opening being adapted to register with the cup openings, fixed stop members on the rim of the chamber, lugs on the rim of the cup adapted when assembled to engage with the stop members on the chamber rim, and projections attached to the plug and adapted to engage the lugs on the cup, said stop members, lugs and projections being positioned so that by turning the plug in one direction, to-wit: counter clockwise, so that the projections engage the lugs and the lugs engage the stop members, the openings in the cup and the chamber will register, and then by turning the plug in the opposite direction, to-wit: clockwise, so that the projections disengage the lugs the openings in the chamber and the cup will register, said cup and plug being adapted to rotate separately and rotate in unison.

3. In a blow off cock the combination of a circular chamber having outlets on the line of a diameter thereof, a circular cup member adapted to rotatably fit in the circular chamber, said cup having two openings through the wall on the line of a diameter, said openings being adapted when assembled with the chamber to register with the openings in the chamber, a plug adapted to rotatably fit within the cup and having an opening therethrough on the line of a diameter, said plug opening being adapted to register with the cup openings, fixed stop members on the rim of the chamber, lugs on the rim of the cup adapted when assembled to engage with the stop members on the chamber rim, and projections attached to the plug and adapted to engage the lugs on the cup, said stop members, lugs and projections being positioned so that by turning the plug and cup counterclockwise until the projections engage the lugs and the lugs engage the stops, the openings in the cup and plug will not register and the openings in the cup and chamber will register, and then by turning the plug clockwise to a predetermined position, the openings in the plug and cup will register.

4. In a blow off cock the combination of a circular chamber, a circular cup adapted to rotatably fit in the chamber and a plug adapted to rotatably fit in the cup, a hole transversely through the assembled chamber, cup and plug, along a line of a common diameter of said chamber, cup and plug, means for turning the plug within the cup, means for turning the plug and cup in unison consisting of a projection on the plug and a lug on the cup adapted to engage each other when the plug is turned and stop means on the chamber adapted to stop the rotation when the holes in the chamber and cup are aligned when turned in one direction, to-wit: counterclockwise, and stop means on the chamber for stopping the rotation when the cup is turned in the opposite direction, to-wit: clockwise, when the said holes in the chamber and cup will not be in alignment, the projection on the plug and the lug on the cup being positioned so that when the projection engages the lug when the plug is given a clockwise movement, the hole through the plug and the hole through the cup are not aligned, and when the plug is turned in the opposite direction, to-wit: counter-clockwise from the position where the projection engaged the lug, a position can be found where the holes through the plug and through the cup will register.

In witness that I claim the foregoing I have hereunto set my hand this 28th day of January, 1925.

OMER HUFF.